Dec. 6, 1927.
G. F. COURTOIS
1,651,808
DEVICE FOR SPRAYING LIQUIDS
Filed Jan. 30, 1924   2 Sheets-Sheet 1
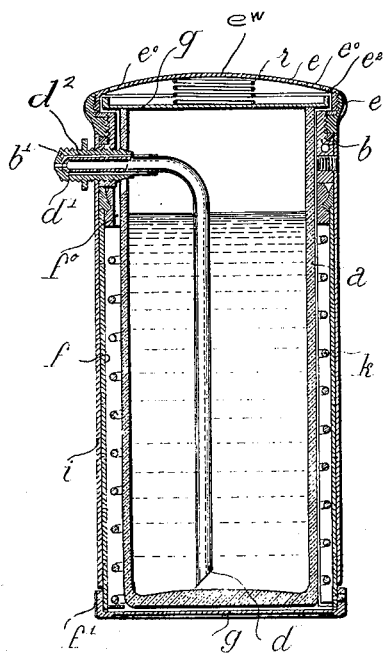
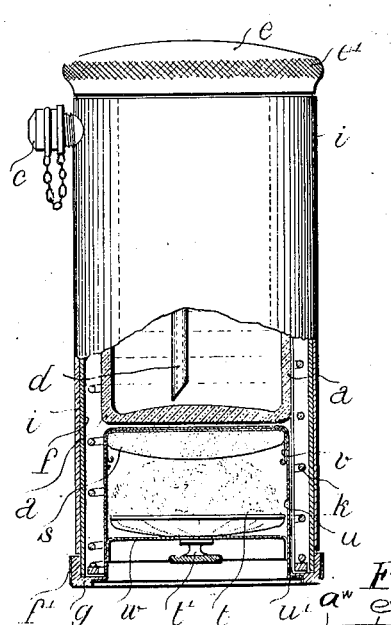
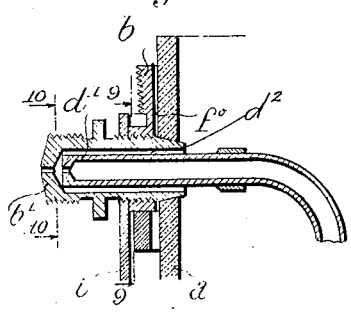
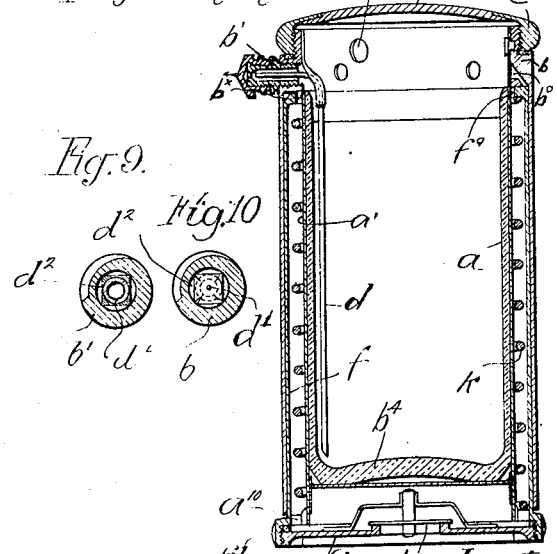
Inventor
Gaston Frédéric Courtois,
by
Attorney Dec. 6, 1927. 1,651,808
G. F. COURTOIS
DEVICE FOR SPRAYING LIQUIDS
Filed Jan. 30, 1924 2 Sheets-Sheet 2
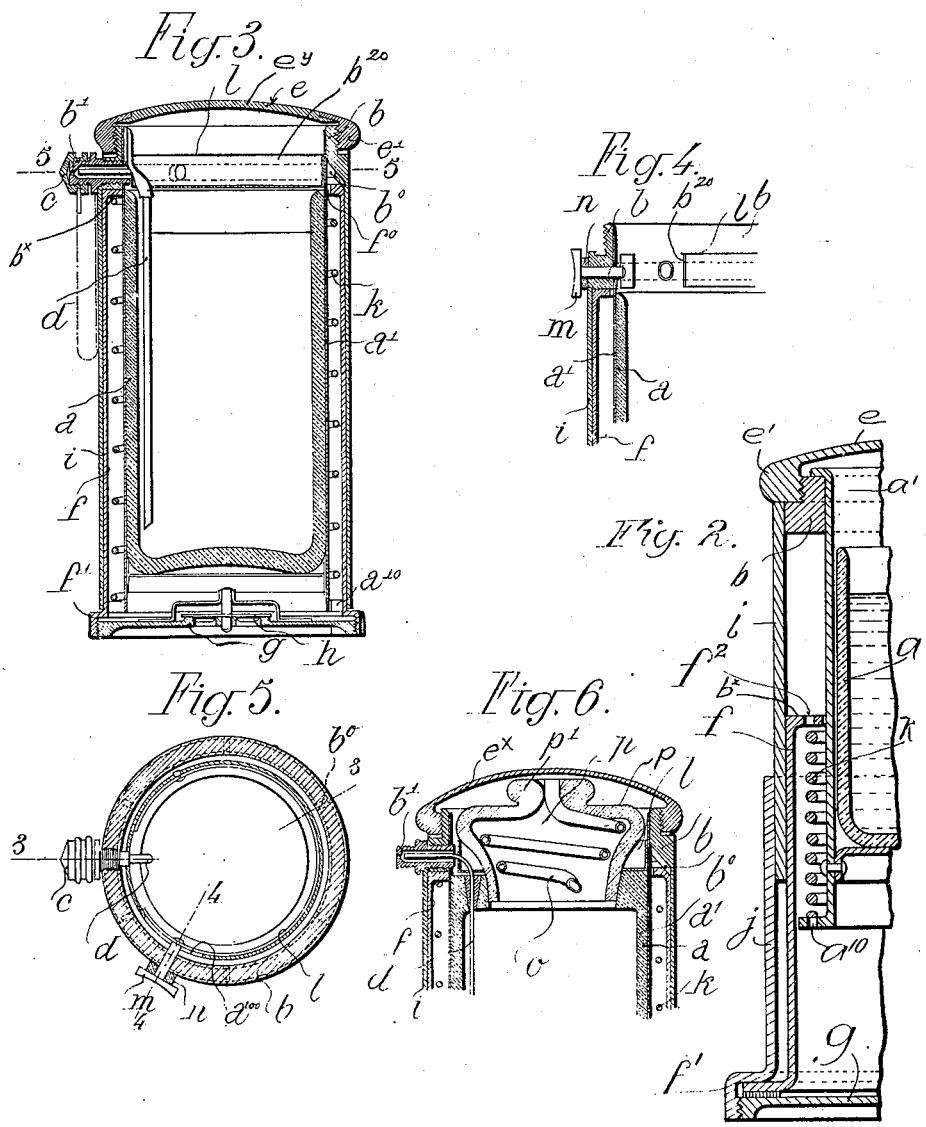
Inventor
Gaston Frédéric Courtois,
by Ernus L. Norris,
Attorney.

Patented Dec. 6, 1927.

1,651,808

UNITED STATES PATENT OFFICE.

GASTON FRÉDÉRIC COURTOIS, OF LYON, FRANCE.

DEVICE FOR SPRAYING LIQUIDS.

Application filed January 30, 1924, Serial No. 689,503, and in Belgium February 5, 1923.

This invention relates to devices for spraying or projecting under pressure various liquids, contained in the device, and more particularly, though not exclusively, to the class of devices known as "scent sprays" for spraying liquid perfumes.

The principal object of the invention is to so construct devices of the class specified that they will require less manipulation to spray or dispense a relatively large quantity of material and with less waste of the material sprayed, and also to simplify the construction of this class of devices and provide for easy cleaning of the same.

The improved device is preferably of the type which comprises a compression pump for compressing the elastic fluid to be utilized for spraying purposes, and the invention consists essentially in so arranging the parts of the device that, when the pump system has been operated to compress or store up the fluid under pressure, the improved device is instantly operative to spray the substance desired to be dispensed without requiring compressing manipulation at the time of use.

The invention also consists in the general construction and arrangement of the several parts which will be more fully hereinafter described and claimed.

In the drawings:

Fig. 1 is a vertical axial section of a cylindrical scent spray for liquid perfume embodying the features of the invention.

Fig. 2 is a similar view, showing a modification of the structure.

Fig. 3 is a vertical section on the line 3—3, Fig. 5, showing a further modification.

Fig. 4 is a vertical section on the line 4—4, Fig. 5.

Fig. 5 is a horizontal section on the line 5—5, Fig. 3.

Fig. 6 is a partial central vertical section of a further modified form of the improved device.

Fig. 7 is a central vertical section of a scent spray embodying the features of the invention in a still further modified form.

Fig. 8 is an enlarged partial vertical section of a still further modified form of the spray.

Fig. 9 is a vertical section on the line 9—9, Fig. 8.

Fig. 10 is a vertical section on the line 10—10, Fig. 8.

Fig. 11 is a view, partly in elevation and partly in vertical section, of a still further modified form of the improved spray and particularly showing a compartment for receiving toilet articles.

The improved spray device as shown will be described as a construction particularly adapted for spraying liquid perfumes.

Referring first to Figures 1 and 2, the device comprises an inner receptacle $a$, which is of cylindrical form and adapted to contain the liquid perfume, the said receptacle being constructed of such material as to avoid reaction between said material and the contents. Attached concentrically to the receptacle $a$ is a shield or sheathing $a'$, and spaced a suitable distance from the said shield or sheath and the inner receptacle is an outer tube or casing $f$ having a base or bottom portion $g$ with a central, inwardly opening valve $h$. The bottom $b^4$ of the inner receptacle is located a distance above the said bottom $g$ and valve $h$ in the constructions shown by Figs. 1, 3 and 11, and to the top edge of the shield or sheath $a'$ a supporting fitting is applied. This fitting includes a ring $b$ attached to the upper exterior portion of the shield or sheath $a'$. A spray nozzle $b'$ passes radially through the ring $b$, which spray nozzle may be provided, as shown in Figs. 3 and 5, with a screw stopper $c$, which is applied to close the nozzle when the device is not in use. Connected to the ring $b$ and nozzle $b'$ is a capillary tube $d$, the said tube extending downwardly close to the bottom of the inner receptacle $a$. The device is completed by a closed cap $e$ which is applied to the ring $b$, preferably by a screw thread connection, and may be readily removed for filling purposes. The central portion of the cap, as at $e^y$, is preferably formed of transparent material to enable the interior of the receptacle $a$ to be inspected to determine the height of the liquid therein.

Between the inner receptacle $a$ and the tube $f$, and also between the bottom of the said receptacle and the bottom $g$ of the tube, suitable spaces are provided. An inner shoulder $b^x$ is also provided at the upper open end of the tube $f$ and is adapted to bear against the ring $b$ when the device is in normal condition. The device is shown in Figure 1 as having a space $f^0$ of suitable dimensions between the shoulder $b^x$ and a receptacle $a$, whereas in Figure 2 the device is shown as having a passageway $f^2$ through the shoulder $b^x$. There are also openings $b^0$ communicating with the inner receptacle *a* that are covered when the device is in closed position. An outer tube or casing *i* is secured at its upper extremity to the ring *b* and envelops the tube *f* and is so arranged that it will slide along the latter. A helical spring *k* is disposed between the receptacle *a* and tube *f*, and when the tubes *f* and *i* are pulled apart, or the one slidingly moved with relation to the other and released, they automatically return to their initial or normal position. The spring *k* is so mounted that when the device is not in use, there is no appreciable force exerted by the said spring on any of the parts, one end of the spring resting against the inner shoulder $b^x$ of the tube *f* and the other end against the lower extremity or portion of the shield or sheath *a'*. Between the bottoms of the receptacle *a* and the tube *f*, openings $a^{10}$ are provided for establishing communication with the space between the said bottoms and the space between the shield or sheath *a'* and tube *f*.

From the foregoing it will be seen that the tubes *i* and *f* together with the parts to which they are connected, perform a function with respect to one another similar to the cylinder and piston of a pump, and an air tight fit between the two parts will be ensured by appropriate packing means.

Assuming that a quantity of liquid perfume has been deposited in the inner receptacle *a* with the level thereof below the upper open end of the said receptacle and that the screw cap or closure *c* for the nozzle *b'* has been removed, the improved device or apparatus will then be prepared for use, and in operation is held in a substantially vertical position. When tractive or pulling force in an axial direction is exerted against the force of the spring *k*, the tubes *i* and *f* slide with respect to one another. The pull may be exerted on the tube *f*, for example, by grasping with one hand a beading *f'* on the latter tube while at the same time holding the tube *i* in fixed position by grasping with the other hand a projecting edge *e'* of the cap *e*. The pull, however, may be exerted on both tubes. In either operation the valve *h* opens and air at atmospheric pressure enters between the bottoms of the receptacle *a* and tube *f* and passes through the openings $a^{10}$ into the annular space between the said tubes through the space $f^0$ or passageway $f^2$ and passages $b^0$, which are now open to the receptacle *a* above the top level of the liquid in the latter receptacle. When the tubes *i* and *f* are relieved of pulling tension or tractive force, the valve *h* closes under the air pressure and the said tubes return to their normal position through the influence or action of the spring *k*, and thereby the air introduced into the device as just explained is compressed. This compression is applied to the surface of the liquid in the inner receptacle *a* and causes said liquid to pass upwardly through the tube *d* and through the nozzle *b'*, from which it is delivered as a spray. When the tubes *i* and *f* resume their normal relative positions, the space $f^0$ or passageway $f^2$ and passage $b^0$ are closed.

Instead of having the tube *i* mounted wholly against the outer side of the tube *f* as shown by Fig. 1, the said tube *i* may be mounted to slide in an annular space provided by applying another tube *j* mounted concentrically on the outside of the tube *f* and extending partially over the length of the two tubes *i* and *f* as shown in Figure 2. This slightly modified arrangement will not in the least affect the general operation of charging the device with air under pressure as just explained. After the device has been charged with air and the latter compressed, the whole or a portion of the liquid in the inner receptacle *a* may be sprayed or dispensed, as desired, and if only a portion of the liquid is to be discharged and the nozzle *b'* closed by means of the cap *c*, the device will be in condition for further service at some other time without requiring a recharge of air under pressure therein by the operation above explained, and by this means the device is materially advantageous relatively to structures previously adopted and requiring air storage and manipulation at each time of use or service thereof.

In some cases there may be combined with the device constructed and operating as previously described, means, such as those illustrated in Figs. 3, 4 and 5, that will maintain the pressure of the air, after the device has been charged, as long as is required before spraying action of the liquid is effected. This modification is especially adapted for use with spray devices of small size. The means preferably used for this purpose comprises a movable obturator consisting of a blade spring *l* of requisite strength. This spring is applied against the inner surface of the shield or sheathing *a'*, being fixed at one of its ends against the said shield or sheath and covering at its opposite end an opening $a^{100}$ formed in the said shield or sheath and communicating with an annular channel $b^{20}$, into which open the openings $b^0$. A button *m* having a suitable shank extending through the wall structure of the device as hereinbefore explained is provided for exterior manipulation and serves when actuated to uncover the opening $a^{100}$ by pushing away the extremity of the spring to which the said button is attached towards the interior of the device. This button returns to its original position under the influence of a rubber washer *n*. It will be understood that as long as the spring *l* is over the opening $a^{100}$, the compressed air is retained in the device, and when the button is pressed inwardly to uncover the said opening $a^{100}$, a certain quantity of the air under pressure, or if necessary the whole of the compressed air stored within the device, may be liberated, depending upon the length of time the said button is depressed, the air passing through the opening $a^{100}$ and into the upper portion of the inner receptacle $a$ and against the upper surface of the liquid contained in the latter, to produce the spray. If it is desired to restore the device to its original condition during the time a certain amount of compressed air still remains stored therein, it is only necessary to open the valve $h$ and the compressed air will then escape therethrough.

In some cases where the construction just described which prevents accidental leakage of the liquid from the inner receptacle is not embodied in the device, it is proposed to provide means for preventing such leakage during the time the improved device is carried in a flat or inclined position. Fig. 6 shows means for this purpose, consisting of a serpentine pipe $o$ which is mounted in an inside hollow carrier $p$ disposed above the upper level of the liquid and within the ring $b$ and under the cap $e^x$. The upper end of this serpentine pipe $o$ extends through the contracted top $p'$ of the said hollow carrier $p$ and the lower end of the said pipe terminates within the hollow receptacle $p$ near the bottom of the latter. This supplemental holding means $p$ will be preferably formed of glass or similar vitreous material. By the use of this supplemental receptacle and serpentine pipe $o$, the compressed air between the tube $f$ and receptacle $a$ cannot penetrate above the liquid except by passing through the said serpentine pipe. If the serpentine pipe is properly arranged as shown, the liquid in the improved device when the latter is inclined will be prevented from freely passing out through the top portion of the device, or within the enclosure provided by the cap $e^x$, and will be forced to enter the serpentine pipe $o$, which will set up such a tortuous passageway as to entirely obstruct leakage under the circumstances mentioned, and when the device is restored to normal upright position, such of the liquid as may have entered the serpentine pipe $o$ will flow back into the receptacle $a$. As shown, the supplemental receptacle $p$ forms essentially a closure or stopper for the receptacle $a$. This additional attachment will not be used with the improved spraying means or device if the latter is always disposed in vertical position, for the reason that the level of the liquid is then below the upper extremity of the shield or sheath $a'$, and furthermore, the said supplemental attachment will also be omitted in the form of the improved spray device provided with the leaf spring $l$. The cap $e^x$ as shown by Fig. 6 slightly differs in construction from the similar cap of the preceding figures and consists of a continuous dome-shaped sheet or thickness of material.

A still further modification is disclosed by Figs. 7 to 10, inclusive, which consists in omitting the valve $h$ in the bottom $g$ of the tube $f$, as heretofore described, and providing a valve $q$ in the cap $e^w$. This valve $q$ operates in accordance with the pressure on its two surfaces, through the intervention, if necessary, of a spring $r$, which causes the valve to seat on the upper edge of the opening of the inner receptacle, the latter in this instance being extended up to the interior of the cap $e^w$. The ring $b$ and also the serpentine pipe $o$ and the supplemental receptacle $p$ heretofore described are omitted from this form of the device. This valve $q$ may also be disposed on another seat $e^2$ provided in the cap $e^w$ at the bottom of the latter. This valve $q$ is adapted to set up an annular communicating space between its edge or wall and the inner surface of the cap $e^w$, of suitable size but of relatively small sectional area to establish communication with the annular space between the receptacle $a$ and tube $f$ through the openings $f^6$. In the cap $e^w$ as thus constructed is provided a number of openings $e^0$, so that, when the device is not in use, the openings $e^0$ and passages $f^6$ are in communication with the outer air. When this embodiment of the device is not in use and the inner receptacle $a$ contains perfumed liquid as heretofore explained, the tubes $f$ and $i$, if pulled in opposite directions in the manner already described atmospheric air will pass into the device through the openings $e^0$ and thence into the inner annular space between the cap $e^w$ and valve $q$. The valve will then rest on the lower seat and the air will spread between the receptacle $a$ and tube $f$. When the two tubes $f$ and $i$ are released and allowed to move toward one another, the air drawn into the apparatus is compressed under the action of the spring $r$ and moves the valve away from its lower seat. If the annular space between the outer edge of the valve and the corresponding wall of the ring $b$ is sufficiently small, there is produced a certain compression of the air and this acting on the lower surface of the valve $q$ will move the valve against its upper seat $e^2$ during the whole time that the movement of the return of the tubes $f$ and $i$ is taking place and also during the passage of the liquid from the receptacle $a$ to be converted into spray. When the two tubes $f$ and $i$ have returned to their normal position, the outer air pressure falls and the valve $q$ returns to its lower seat under the action of its weight and that of the spring $r$ and, when the cap $c$ is placed on the nozzle $b'$, prevents all egress of liquid, whatever may be the position of the device when not in use.

The location of the valve which controls ingress of atmospheric air from the exterior of the device in the cap $e^w$ as just explained and the omission of the said valve from the bottom of the device provides a space at the bottom that may be chambered and utilized to contain toilet articles such as a powder puff, rouge, and the like, and the whole device is reversible and may be placed in a lady's bag or a traveling bag. This additional receptacle constructed is illustrated by Fig. 11, wherein the inner receptacle $a$ is shown as shorter than in the previous forms of the device, the additional receptacle extending between the bottom of the inner receptacle $a$ and the bottom of the device. In the space thus provided a dished member $u$ is mounted inside of the helical spring $k$, said dished member $u$ being preferably stamped and provided with a flange $u'$ which is soldered to the edge $g'$ of the circular opening provided at the bottom $g$ of the tube $f$. In the dished or cup-like member $u$ a small stamped dish $v$ is frictionally engaged, in which is fixed a cake of powder $s$, and a certain distance below this stamped dish $v$ is a further stamped cover dish $w$, in the center of which is fixed a powder puff $t$, the said dished cover member $w$ being frictionally forced into the dished or cup-like member $u$ and has a grasping button or grip device $t'$ for convenience in removing the cover dish $w$ and replacing the same after the powder puff has been used.

Figs. 7 to 10, inclusive, also disclose means for conveniently separating the tube 9 from the nozzle $b'$ for cleaning these parts without disorganizing the remaining members of the improved device. This further advantageous structure, consists in forming the outer extremity of the angular member $d'$ of the tube $d$, which is inserted in the nozzle $b'$, square in cross section, so as to form four faces extending longitudinally of the said tube extremity. This angularly projecting extremity $d'$ of the tube $d$ formed as just specified, is inserted in the bore of the nozzle $b'$ and is frictionally held in the said nozzle and the flat faces provide spaces $d^2$ relatively to the cylindrical wall of the bore of the nozzle $b'$, and through these spaces compressed air may pass and abut against the outer extremity of the nozzle $b'$, which forms an atomizing chamber construction and which will advantageously operate in effecting a spray of the contents of the inner receptacle $a$. In order to remove the tube $d$ and its angular extremity $d'$, the cap $e^w$ is first removed from the device, thereby fully exposing the upper portion of the inner receptacle $a$ and rendering the capillary tube accessible. In removing the capillary tube it is only necessary to grasp the same and pull inwardly thereon to release the angular extremity $d'$, shaped as specified, until the said extremity is fully disengaged from the bore of the nozzle $b'$, and then the said nozzle, in view of its screw-threaded attachment, may also be removed and both parts cleaned for more efficient operation. After cleaning, these parts may be readily replaced in operative position and the cap $e^w$ then re-applied to the top of the device as shown in Fig. 7.

It will be understood from the foregoing that a certain amount of air passes out with the liquid sprayed from the inner receptacle $a$, as usual in devices of this character. The structure disclosed by Figs. 7 to 10, inclusive, and whereby the tube and its angular extremity may be removed from the nozzle $b'$, may be used in connection with any of the previously described structures.

What is claimed as new is:

1. A device for spraying or projecting material such as powder or liquids under pressure, comprising in combination, an inner receptacle for holding the material to be sprayed, a casing carried by said receptacle, another casing concentric with the receptacle and first-named casing and in slidable relation to the latter, the two casings in slidable relationship constituting the equivalent of a cylinder and a piston, the casing being spaced from the inner receptacle and provided with openings adapted to establish communication between the upper portion of said receptacle and the space separating the casings from the receptacle, valve means for admitting atmospheric air from the exterior to the interior of the said casings and the inner receptacle, a spring surrounding the inner receptacle and located in the space between the latter and the said casings, and a nozzle having a tube extending therefrom into the inner receptacle for spraying the contents of the receptacle.

2. A device of the class specified, comprising an inner receptacle for containing material to be ejected from the device, casings surrounding the said receptacle and spaced from the latter, said casings having a sliding association in the manner of a cylinder and piston and being adapted to be drawn apart, means located in the space between the inner receptacle and the casings for automatically returning the casings to normal position, means for permitting atmospheric air to enter the device when the casings are drawn apart, and means for effecting a spray of the contents of the receptacle to the exterior of the device by air automatically compressed within the device, the spraying operation being controlled as to its continuity by means operable to retain the air under pressure within the device when it is undesirable to effect a spray by the full amount of air under pressure within the device.

3. A device of the class specified, comprising an inner receptacle to contain material to be ejected, casings surrounding and spaced from the said receptacle, said casings having a sliding association in the manner of a piston and cylinder and being adapted to be relatively drawn apart, means within the space between the inner receptacle and the said casings for automatically returning the casings to normal position said means operating to compress the air within the device during the return movement of the casing to normal position, means for permitting air to enter the device when the casings are drawn apart, and means operable to effect the spraying of the contents of the receptacle to the exterior of the device by the air compressed within the device and to control the duration of the spray and to retain a part of the air under pressure within the device.

4. A device of the class specified, comprising an interiorly located containing receptacle for the material to be sprayed from the device, casings surrounding the said receptacle and having a sliding association in the manner of a piston and cylinder and being adapted to be drawn apart, means for automatically returning the casings to normal position after the casings are drawn apart, means for effecting a spray of the contents of the receptacle to the exterior of the device by air compressed within the device, and valve means operable to control the ingress of air and to prevent the indrawn air from escaping from the device when the parts of the latter assume normal position.

In testimony whereof I have hereunto set my hand.

GASTON FRÉDÉRIC COURTOIS.